(12) United States Patent
Garitano

(10) Patent No.: US 8,002,929 B2
(45) **Date of Patent: *Aug. 23, 2011**

(54) IMAGES IN SOLID SURFACES

(75) Inventor: Gilbert Garitano, Alameda, CA (US)

(73) Assignee: Images in Solid Surfaces, LLC, Alameda, CA (US)

(*) Notice: Subject to any disclaimer, the term of this patent is extended or adjusted under 35 U.S.C. 154(b) by 226 days.

This patent is subject to a terminal disclaimer.

(21) Appl. No.: 12/287,476

(22) Filed: Oct. 9, 2008

(65) Prior Publication Data

US 2009/0075037 A1 Mar. 19, 2009

Related U.S. Application Data

(63) Continuation of application No. 11/102,419, filed on Apr. 8, 2005, now abandoned, which is a continuation of application No. 09/940,236, filed on Aug. 27, 2001, now Pat. No. 7,001,660.

(60) Provisional application No. 60/305,781, filed on Jul. 16, 2001.

(51) Int. Cl.
*B32B 3/10* (2006.01)

(52) U.S. Cl. ..................... 156/230; 156/277; 428/195.1; 428/67; 428/327; 428/151; 428/156; 428/500; 526/328; 524/437

(58) Field of Classification Search .................. 156/277, 156/195.1, 67, 327, 151, 156, 500; 428/195, 428/67, 327; 526/328; 524/437
See application file for complete search history.

(56) References Cited

U.S. PATENT DOCUMENTS

| | | | |
|---|---|---|---|
| 3,827,933 | A | 8/1974 | Duggins et al. |
| 3,847,865 | A | 11/1974 | Duggins et al. |
| 4,059,471 | A | 11/1977 | Haigh |
| 4,085,246 | A | 4/1978 | Buser et al. |
| 4,107,135 | A | 8/1978 | Duggins et al. |
| 4,159,301 | A | 6/1979 | Buser et al. |
| 4,406,662 | A | 9/1983 | Beran et al. |
| 4,413,089 | A | 11/1983 | Gavin et al. |
| 4,433,070 | A | 2/1984 | Ross et al. |
| 4,473,673 | A | 9/1984 | Williams et al. |
| 4,544,584 | A | 10/1985 | Ross et al. |
| 4,652,596 | A | 3/1987 | Williams et al. |
| 4,961,995 | A | 10/1990 | Ross et al. |
| 5,149,734 | A | 9/1992 | Fisher et al. |
| 5,244,941 | A | 9/1993 | Bruckbauer et al. |
| 5,246,518 | A | 9/1993 | Hale |
| 5,248,363 | A | 9/1993 | Hale |
| 5,286,290 | A | 2/1994 | Risley |
| 5,302,223 | A | 4/1994 | Hale |
| 5,393,808 | A | 2/1995 | Buonaura et al. |
| 5,431,501 | A | 7/1995 | Hale et al. |
| 5,457,152 | A | 10/1995 | Gaa et al. |
| 5,487,614 | A | 1/1996 | Hale |
| 5,488,907 | A | 2/1996 | Xu et al. |
| 5,521,243 | A | 5/1996 | Minghetti et al. |

(Continued)

OTHER PUBLICATIONS

NLS Analytical Report on Composition of 1991 New Years Eve Flamingo Hilton $5 Poker Chip.

*Primary Examiner* — Khanh Nguyen
*Assistant Examiner* — Margaret Squalls

(57) ABSTRACT

The present invention relates to systems and methods for forming images in solid surfaces, and to solid surfaces containing an image. In particular, the present invention provides systems and methods for forming images in polymeric materials, and polymeric materials containing an image with novel optical density characteristics.

14 Claims, 5 Drawing Sheets
(4 of 5 Drawing Sheet(s) Filed in Color)

U.S. PATENT DOCUMENTS

| | | | |
|---|---|---|---|
| 5,522,317 | A | 6/1996 | Hale et al. |
| 5,555,813 | A | 9/1996 | Hale et al. |
| 5,567,745 | A | 10/1996 | Minghetti et al. |
| 5,575,877 | A | 11/1996 | Hale et al. |
| 5,590,600 | A | 1/1997 | Hale et al. |
| 5,601,023 | A | 2/1997 | Hale et al. |
| 5,640,180 | A | 6/1997 | Hale et al. |
| 5,642,141 | A | 6/1997 | Hale et al. |
| 5,644,988 | A | 7/1997 | Xu et al. |
| 5,705,552 | A | 1/1998 | Minghetti et al. |
| 5,718,793 | A | 2/1998 | Inamoto et al. |
| 5,734,396 | A | 3/1998 | Hale et al. |
| 5,746,816 | A | 5/1998 | Xu |
| 5,746,866 | A | 5/1998 | Tanaka et al. |
| 5,747,154 | A | 5/1998 | Minghetti et al. |
| 5,757,154 | A | 5/1998 | Peot |
| 5,800,904 | A | 9/1998 | Hallman et al. |
| 5,826,396 | A | 10/1998 | Michaels |
| 5,830,263 | A | 11/1998 | Hale et al. |
| 5,856,389 | A | 1/1999 | Kostrzewski et al. |
| 5,985,972 | A | 11/1999 | Minghetti et al. |
| 6,025,023 | A | 2/2000 | Valente et al. |
| 6,040,045 | A | 3/2000 | Alfonso et al. |
| 6,177,449 | B1 | 1/2001 | Brendel et al. |
| 6,203,911 | B1 | 3/2001 | Webert et al. |
| 6,409,870 | B1 | 6/2002 | Duffney |
| 7,001,660 | B2 | 2/2006 | Garitano |

A

PREHEAT 400-410 F DEGREES 4 MINUTES SUBLIMATE 400-410 F DEGREES 10 SECONDS 40# PRESSURE

B

PREHEAT 400-410 F DEGREES 4 MINUTES SUBLIMATE 400-410 F DEGREES 8 SECONDS 40# PRESSURE

C

PREHEAT 400-410 F DEGREES 4 MINUTES SUBLIMATE 400-410 F DEGREES 6 SECONDS 40# PRESSURE

D

PREHEAT 400-410 F DEGREES 4 MINUTES SUBLIMATE 400-410 F DEGREES 4 SECONDS 40# PRESSURE

Double-Heat Press

A

FOUNTAINHEAD BY NEVAMAR
PREHEAT @400 F DEGREES 45# PRESSURE
4 MINUTES

SUBLIMATE @ 400 F DEGRESS 45# 45 SECONDS
EXCELLENT BLACK & COLOR & DETAIL

B

C

#1 & #2 WILSONART GIBRALTAR
DESIGNER WHITE
PREHEAT @ 400 F DEGREES 45# PRESSURE
4 MINUTES

SUBLIMATE 400 F DEGREES 45 # 45 SECONDS

IMAGE SUBLIMATED EXCELLENT GOOD BLACKS
GOOD COLOR, GOOD DETAIL

RESULTS: EXCELLENT GOOD FOR PRODUCT

PREHEAT 325 F DEGREES 4 MINUTES SUBLIMATE 400-410 F DEGREES 30 SECONDS 45# PRESSURE

PREHEAT 350 F DEGREES 4 MINUTES SUBLIMATE 400-410 F DEGREES 30 SECONDS 45# PRESSURE

PREHEAT 375 F DEGREES 4 MINUTES SUBLIMATE 400-410 F DEGREES 30 SECONDS 45# PRESSURE

IMAGES IN SOLID SURFACES

CROSS REFERENCE TO RELATED APPLICATIONS

The present application is a Continuation of U.S. Ser. No. 11/102,419, filed Apr. 8, 2005, presently pending, which is a Continuation of U.S. Ser. No. 09/940,236, filed Aug. 27, 2001, now U.S. Pat. No. 7,001,660, issued Feb. 21, 2006, which in turn claims priority to Provisional Application Ser. No. 60/305,781, filed Jul. 16, 2001, each of which are herein incorporated by reference in their entireties.

STATEMENT REGARDING FEDERALLY SPONSORED RESEARCH OR DEVELOPMENT

None.

FIELD OF THE INVENTION

The present invention relates to systems and methods for forming images in solid surfaces, and to solid surfaces containing an image. In particular, the present invention provides systems and methods for forming images in polymeric materials, and polymeric materials containing an image with novel optical density characteristics.

BACKGROUND OF THE INVENTION

The solid surface material category of particle filled resins (i.e. filled polymeric materials) was created with the invention of CORIAN by DuPont in the late 1960s. Since the introduction of CORIAN, similar filled polymeric materials have been introduced, such as GIBRALTAR and SSV by Wilsonart, FOUNTAINHEAD and SURELL by Formica Corporation, and AVONITE by Avonite Incorporated. Marketed as a superior alternative to laminate products for kitchen and bathroom surfaces, filled polymeric materials quickly became known for many advantages, such as solidity, hardness, durability, renewability, and fire resistance. In addition, the non-porous nature of filled polymeric materials makes them easy to clean, and particularly resistant to bacteria, stains, and chemicals. Unfortunately, these same qualities are responsible for two chief drawbacks of filled polymeric material: high cost and resistance to impregnation by colorants. Laminate products, by contrast, are both inexpensive and available in an enormous range of colors and styles.

In recent times, the cost of solid surface materials has come down, but in the more than 30 years since their marketplace debut, the pallet of available colors and styles for solid surface materials has yet to significantly expand. In addition to being a competitive disadvantage against laminates in traditional uses, the relative dearth of aesthetic variety and inability to incorporate vivid colors or detailed images within filled polymeric materials has hindered their expansion into new applications. What is needed are systems and methods for adding vivid color and detailed images to filled polymeric materials.

SUMMARY OF THE INVENTION

The present invention provides systems and methods for forming images in solid surfaces, and to solid surfaces containing an image. In particular, the present invention provides systems and methods for forming images in polymeric materials, and polymeric materials containing an image with novel optical density characteristics.

In some embodiments, the present invention provides compositions comprising: a) a filled polymeric material comprising a polymer component and an inorganic filler; and b) a fixed image, wherein the fixed image is formed in the filled polymeric material, and wherein the fixed image has a fixed image optical density value within about 1.5 of a corresponding transfer image optical density value. In certain embodiments, the fixed image optical density value is within about 1.0 of the corresponding transfer image optical density value. In other embodiments, fixed image optical density value is within about 0.5 of the corresponding transfer image optical density value. In certain embodiments, the fixed image optical density value is within about 0.3 of the corresponding transfer image optical density value. In additional embodiments, the fixed image optical density value is within about 2.0, 1.8, 1.6, 1.4, 1.2, 1.0, 0.8, 0.6, 0.5, 0.4, 0.3, 0.2, or 0.1 of the corresponding fixed image optical density value (e.g. as measured by a densitometer).

In certain embodiments, the present invention provides compositions comprising: a) a filled polymeric material comprising a polymer component and an inorganic filler; and b) a fixed image, wherein the fixed image is formed in the filled polymeric material, and wherein the fixed image has a fixed image optical density value of at least 0.7. In some embodiments, the fixed image optical density value is at least 0.8. In other embodiments, the fixed image optical density value is at least 1.0. In further embodiments, the fixed image optical density value is at least 0.9, 1.0, 1.2, 1.4, 1.6, 1.8, 2.0, or 2.2 (e.g. when measuring a shade of black in the fixed image).

In some embodiments, 15-80 percent by weight of the filled polymeric material comprises the polymer component. In preferred embodiments, 20-45 percent by weight of the filled polymeric material comprises the polymer component. In other embodiments, at least 10 percent by weight of the filled polymeric material comprises the polymer component. In particular embodiments, at least 25 percent, 40 percent, 50 percent, 60 percent, or 70 percent by weight of the filled polymeric material comprises the polymer component. In certain embodiments, no greater than 50 percent by weight of the filled polymeric material comprises the polymer component. In other embodiments, no greater than 40 percent, 30 percent, 20 percent, 15 percent, 10 percent, or 5 percent by weight of the filled polymeric material comprises the polymer component. In preferred embodiments, the polymer component comprises polymethyl methacrylate. In particularly preferred embodiments, 20-45 percent by weight of the filled polymeric material comprises polymethyl methacrylate.

In certain embodiments, the polymer component comprises polyacrylic. In other embodiments, the polymer component comprises polyester. In other embodiments, the filled polymeric material comprises less than 10 percent by weight of polyester. In some embodiments, the filled polymeric material comprises less than 8 percent, 6 percent, 5 percent, 4 percent, 3 percent, 2 percent, or 1 percent by weight of polyester. In particular embodiments, the filled polymeric material further comprises an agglomerate material (e.g. marble particles, sand particles, quartz particles or granite particles). In preferred embodiments, less than 40%, 30%, 20%, 10%, 5%, 3% of the composition by weight is an agglomerate material. In other embodiments, the filled polymeric material further comprises a pigment component (e.g. mixed in during manufacturing process).

In some embodiments, 20-85 percent by weight of the filled polymeric material comprises the inorganic filler. In preferred embodiments, 55-80 percent by weight of the filled polymeric material comprises the inorganic filler. In other embodiments, 65-80 or 75-80 percent by weight of the filled polymeric material comprises the inorganic filler. In some embodiments, at least 50 percent by weight of the filled polymeric material comprises the inorganic filler. In other embodiments, at least 60 percent, 70 percent, 80 percent, 85 percent, 90 percent, or 95 percent by weight of the filled polymeric material comprises the inorganic filler. In certain embodiments, no greater than 95% by weight of the filled polymeric material comprises the inorganic filler. In particular embodiments, no greater than 90 percent, 85 percent, 80 percent, 70 percent, or 60 percent by weight of the filled polymeric material comprises the inorganic filler. In preferred embodiments, the inorganic filler comprises alumina trihydrate. In particularly preferred embodiments, 55-80% by weight of the filled polymeric material comprises alumina trihydrate. In other preferred embodiments, about 80% by weight of said filled polymeric material comprises alumina trihydrate.

In certain embodiments, the filled polymeric material comprises CORIAN. In some embodiments, the filled polymeric material comprises a CORIAN analog (e.g. a material made with the same formula as a CORIAN material with slight modification). In particular embodiments, the filled polymeric material comprises GIBRALTAR. In some embodiments, the filled polymeric material comprises a GIBRALTAR analog (e.g. a material made with the same formula as a GIBRALTAR material with slight modification). In further embodiments, the filled polymeric material comprises SOLID SURFACING VENEER (SSV). In some embodiments, the filled polymeric material comprises an SSV analog (e.g. a material made with the same formula as an SSV material with slight modification). In other embodiments, the filled polymeric material comprises FOUNTAINHEAD. In some embodiments, the filled polymeric material comprises a FOUNTAINHEAD analog (e.g. a material made with the same formula as a FOUNTAINHEAD material with slight modification). In particular embodiments, the filled polymeric material comprises FORMSTONE. In some embodiments, the filled polymeric material comprises a FORMSTONE analog (e.g. a material made with the same formula as a FORMSTONE material with slight modification). In certain embodiments, the filled polymeric material comprises AVONITE. In some embodiments, the filled polymeric material comprises a AVONITE analog (e.g. a material made with the same formula as an AVONITE material with slight modification). In other embodiments, the filled polymeric material comprises SURELL. In some embodiments, the filled polymeric material comprises a SURELL analog (e.g. a material made with the same formula as a SURELL material with slight modification). In particular embodiments, the filled polymeric material comprises CERATA. In some embodiments, the filled polymeric material comprises a CERATA analog (e.g. a material made with the same formula as a CERATA material with slight modification). In particular embodiments, the filled polymeric material is selected from the group consisting of ACRYSTONE, ARISTECH, ARISTECH ACRYLIC, AVONITE, CERATA, CORIAN, ETURA, FORMSTONE, FOUNTAINHEAD, GIBRALTAR, SOLID SURFACING VENEER (SSV), SURELL, SWANSTONE, TRILLIUM, or an analog of any one of these materials.

In some embodiments, the fixed image is scratch-resistant (e.g. the image is still visible when rubbed with steelwool, sandpaper, or similar material). In certain embodiments, the fixed image is still visible after removing the top 0.2, 0.5, or 1.0 millimeters of the fixed image (e.g. by grinding on a machine down 0.2, 0.5, or 1.0 millimeters, or scratching the image down 0.2, 0.5, or 1.0 millimeter). In some embodiments, the fixed image is still visible after removing the top 1.5 millimeters of the fixed image (e.g. by grinding on a machine down 1.5 millimeters, or scratching the image down 1.5 millimeters). In particular embodiments, the fixed image is still visible after removing the top 2.0 millimeters of the fixed image (e.g. by grinding on a machine down 2.0 millimeters, or scratching the image down 2.0 millimeters). In certain embodiments, the depth of the fixed image in the filled polymeric material is at least 0.2, 0.5 or 1.0 millimeters (e.g. 1.1 millimeters). In other embodiments, the depth of the fixed image in the filled polymeric material is at least 1.5 millimeters (e.g. 1.6 millimeters). In preferred embodiments, the depth of the fixed image in the filled polymer material is at least 2.0 millimeters (e.g. 2.1, 2.3, 2.4, . . . 3.0 millimeters).

In some embodiments, the fixed image comprises a dye. In certain embodiments, the fixed image comprises sublimated dye (e.g. sublimation dye that has been sublimated into a material). In particular embodiments, the fixed image comprises a heat sensitive dye. In some embodiments, the fixed image comprises a diffusion dye.

In other embodiments, the fixed image has a visual appearance (e.g. it can be seen by the human eye when light reflects off of it). In particular embodiments, at least a portion of the visual appearance is one or more shades of black. In some embodiments, at least a portion of the visual appearance is one or more shades of red. In certain embodiments, at least a portion of the visual appearance is one or more shades of orange. In further embodiments, at least a portion of the visual appearance is one or more shades of yellow. In other embodiments, at least a portion of said visual appearance is one or more shades of green. In some embodiments, at least a portion of the visual appearance is one or more shades of blue. In yet other embodiments, at least a portion of the visual appearance is one or more shades of violet. In additional embodiments, at least a portion of the visual image is a pattern. In some embodiments, at least a portion of the visual image represents an object (e.g. animal, person, vase, tree, etc.).

In some embodiments, the present invention provides methods for forming an image in a polymeric material, comprising; a) providing; i) a filled polymeric material comprising a polymer component and an inorganic filler, and ii) a transfer medium comprising a transfer image; and b) heating the filled polymeric material at a temperature of at least 155 degrees Celsius, and c) contacting at least a portion of the filled polymeric material with at least a portion of the transfer medium such that a fixed image is formed in the filled polymeric material. In certain embodiments, the temperature is at least 175 degrees Celsius (e.g. 160 or 170 or 175 degrees Celsius). In other embodiments, the temperature is at least about 200 degrees Celsius (i.e. 392 degrees Fahrenheit). In particular embodiments, the temperature is about 205 degrees Celsius (i.e. about 400 degrees Fahrenheit). In still other embodiments, the temperature is between 200 and 210 degrees Celsius. In some embodiments, the temperature is between 175 and 210 degrees Celsius or between 150 and 220 degrees Celsius.

In some embodiments, the heating is conducted for a time of at least 0.5 minutes (e.g. at least 0.5, 1.0, 2.0 or 2.5 minutes). In other embodiments, the heating is conducted for a time of at least 3.0 minutes. In additional embodiments, the heating is conducted for a time of at least 3.5 minutes (e.g. at least 3.5, 4.0, or 4.5 minutes). In particular embodiments, the heating is conducted for a time between 1.0 and 10.0 minutes. In other embodiments, the heating is conducted for a time between 10 seconds and 5.0 hours.

In certain embodiments, the contacting is conducted under pressure. In particular embodiments, the pressure is at least 5 pounds per square inch (e.g. 8, 10, 15 or 20 pounds of pressure per square inch). In some embodiments, the pressure is at least 30 pounds per square inch (e.g. at least 30, 35, 40, 45, or 50 pounds of pressure per square inch). In other embodiments, the pressure is about 40 pounds per square inch. In certain embodiments, the pressure has a range of 1-250, 10-100, 20-60, 30-50, or 35-45 pounds of pressure.

In some embodiments, the contacting is for a time less than 5 seconds (e.g. 4 seconds, 3 seconds, or 2 seconds). In particular embodiments, the contacting is for a time of less than 10 seconds (e.g. about 9, 8, 7, or 6 seconds). In certain embodiments, the contacting is for a time of less than 20 seconds (e.g. 19, 18, 17, or 16 seconds). In other embodiments, the contacting is for a time of less than one minute. In particular embodiments, the contacting time is in a range from 1 second to 10 minutes, or 6 seconds to 5.0 minutes, or 15 seconds to 3.0 minutes, or 25 seconds to 2.0 minutes, or 35 seconds to 1.5 minutes, or 40 seconds to 1.5 minutes. In some embodiments, the contacting is conducted at a contacting temperature of at least 350 degrees Fahrenheit (e.g. at least 350, . . . 360, . . . 370, . . . 380, . . . 390 . . . 400 . . . 410 . . . 420 degrees Fahrenheit).

In some embodiments, the present invention provides methods for forming an image in a polymeric material, comprising; a) providing; i) a filled polymeric material comprising a polymer component and an inorganic filler, and ii) a transfer medium comprising a transfer image; and b) heating the filled polymeric material to a temperature of at least 155 degrees Celsius, and c) contacting at least a portion of the filled polymeric material with at least a portion of the transfer medium such that a fixed image is formed in the filled polymeric material. In other embodiments, the present invention provides methods for forming an image in a polymeric material, comprising; a) providing; i) a filled polymeric material comprising a polymer component and an inorganic filler, wherein the filled polymeric material has been heated at a temperature of 155 degrees Celsius, and ii) a transfer medium comprising a transfer image; and b) contacting at least a portion of the filled polymeric material with at least a portion of the transfer medium such that a fixed image is formed in the filled polymeric material. In certain embodiments, the present invention provides methods for forming an image in a polymeric material, comprising; a) providing; i) a filled polymeric material comprising a polymer component and an inorganic filler, wherein the filled polymeric material has been heated to a temperature of 155 degrees Celsius, and ii) a transfer medium comprising a transfer image; and b) contacting at least a portion of the filled polymeric material with at least a portion of the transfer medium such that a fixed image is formed in the filled polymeric material.

In certain embodiments, the present invention provides methods for heat transfer printing, comprising; a) providing; i) a filled polymeric material comprising a polymer component and an inorganic filler, ii) a transfer medium comprising a transfer image, and iii) an image transfer device configured for heating and pressing the filled polymeric material; and b) heating the filled polymeric material with the image transfer device at a temperature of at least 155 degrees Celsius, and c) contacting at least a portion of the filled polymeric material with at least a portion of the transfer medium such that a fixed image is formed in the filled polymeric material. In some embodiments, the present invention provides methods for heat transfer printing, comprising; a) providing; i) a filled polymeric material comprising a polymer component and an inorganic filler, ii) a transfer medium comprising a transfer image, and iii) an image transfer system configured for heating and pressing the filled polymeric material; and b) heating the filled polymeric material with the image transfer system at a temperature of at least 155 degrees Celsius, and c) contacting at least a portion of the filled polymeric material with at least a portion of the transfer medium such that a fixed image is formed in the filled polymeric material.

In certain embodiments, the contacting step is conducted under pressure, wherein the pressure is applied with the image transfer device or system. In some embodiments, the pressure is at least 10 pounds per square inch (e.g. at least 20, 25, 30, 35, 40, 45 pounds per square inch). In certain embodiments, the image transfer device is a heat press (e.g. Geo Knight 994 Combo Press, an 898 Airpro automatic air operated press, or similar device). In some embodiments, the image transfer device is a heat press capable of heating the filled polymeric material from at least two sides (e.g. double heat press shown in FIG. 3). In particular embodiments, the image transfer system comprises a conveyor belt and/or heatable rollers (e.g. wherein heating occurs during movement of a material through the rollers).

In certain embodiments, the fixed image has a fixed image optical density value. In some embodiments, the fixed image has a fixed image optical density value within about 1.5 of a corresponding transfer image optical density value. In certain embodiments, the fixed image optical density value is within about 1.0 of the corresponding transfer image optical density value. In other embodiments, fixed image optical density value is within about 0.5 of the corresponding transfer image optical density value. In certain embodiments, the fixed image optical density value is within about 0.3 of the corresponding transfer image optical density value. In additional embodiments, the fixed image optical density value is within about 2.0, 1.8, 1.6, 1.4, 1.2, 1.0, 0.8, 0.6, 0.5, 0.4, 0.3, 0.2, or 0.1 of the corresponding fixed image optical density value (e.g. as measured by a densitometer).

In certain embodiments, the fixed image has a fixed image optical density value of at least 0.7. In some embodiments, the fixed image optical density value is at least 0.8. In other embodiments, the fixed image optical density value is at least 1.0. In further embodiments, the fixed image optical density value is at least 0.9, 1.0, 1.2, 1.4, 1.6, 1.8, 2.0, or 2.2 (e.g. when measuring a shade of black in the fixed image).

In some embodiments, 15-80 percent by weight of the filled polymeric material comprises the polymer component. In preferred embodiments, 20-45 percent by weight of the filled polymeric material comprises the polymer component. In other embodiments, at least 10 percent by weight of the filled polymeric material comprises the polymer component. In particular embodiments, at least 25 percent, 40 percent, 50 percent, 60 percent, or 70 percent by weight of the filled polymeric material comprises the polymer component. In certain embodiments, no greater than 50 percent by weight of the filled polymeric material comprises the polymer component. In other embodiments, no greater than 40 percent, 30 percent, 20 percent, 15 percent, 10 percent, or 5 percent by weight of the filled polymeric material comprises the polymer component. In preferred embodiments, the polymer component comprises polymethyl methacrylate. In particularly preferred embodiments, 20-45 percent by weight of the filled polymeric material comprises polymethyl methacrylate.

In certain embodiments, the polymer component comprises polyacrylic. In other embodiments, the polymer component comprises polyester. In other embodiments, the filled polymeric material comprises less than 10 percent by weight of polyester. In some embodiments, the filled polymeric material comprises less than 8 percent, 6 percent, 5 percent, 4 percent, 3 percent, 2 percent, or 1 percent by weight of polyester. In particular embodiments, the filled polymeric material further comprises an agglomerate material (e.g. marble particles, sand particles, quartz particles or granite particles). In preferred embodiments, less than 40%, 30%, 20%, 10%, 5%, 3% of the composition by weight is an agglomerate material. In other embodiments, the filled polymer material further comprises a pigment component (e.g. mixed in during manufacturing process).

In some embodiments, 20-85 percent by weight of the filled polymeric material comprises the inorganic filler. In preferred embodiments, 55-80 percent by weight of the filled polymeric material comprises the inorganic filler. In other embodiments, 65-80 or 75-80 percent by weight of the filled polymeric material comprises the inorganic filler. In some embodiments, at least 50 percent by weight of the filled polymeric material comprises the inorganic filler. In other embodiments, at least 60 percent, 70 percent, 80 percent, 85 percent, 90 percent, or 95 percent by weight of the filled polymeric material comprises the inorganic filler. In certain embodiments, no greater than 95% by weight of the filled polymeric material comprises the inorganic filler. In particular embodiments, no greater than 90 percent, 85 percent, 80 percent, 70 percent, or 60 percent by weight of the filled polymeric material comprises the inorganic filler. In preferred embodiments, the inorganic filler comprises alumina trihydrate. In particularly preferred embodiments, 55-80% by weight of the filled polymeric material comprises alumina trihydrate. In other preferred embodiments, about 80% by weight of said filled polymeric material comprises alumina trihydrate.

In certain embodiments, the filled polymeric material comprises CORIAN. In some embodiments, the filled polymeric material comprises a CORIAN analog (e.g. a material made with the same formula as CORIAN with slight modification). In particular embodiments, the filled polymeric material comprises GIBRALTAR. In some embodiments, the filled polymeric material comprises a GIBRALTAR analog (e.g. a material made with the same formula as GIBRALTAR with slight modification). In further embodiments, the filled polymeric material comprises SOLID SURFACING VENEER (SSV). In some embodiments, the filled polymeric material comprises an SSV analog (e.g. a material made with the same formula as SSV with slight modification). In other embodiments, the filled polymeric material comprises FOUNTAINHEAD. In some embodiments, the filled polymeric material comprises a FOUNTAINHEAD analog (e.g. a material made with the same formula as FOUNTAINHEAD with slight modification). In particular embodiments, the filled polymeric material comprises FORMSTONE. In some embodiments, the filled polymeric material comprises a FORMSTONE analog (e.g. a material made with the same formula as FORMSTONE with slight modification). In certain embodiments, the filled polymeric material comprises AVONITE. In some embodiments, the filled polymeric material comprises a AVONITE analog (e.g. a material made with the same formula as AVONITE with slight modification). In other embodiments, the filled polymeric material comprises SURELL. In some embodiments, the filled polymeric material comprises a SURELL analog (e.g. a material made with the same formula as SURELL with slight modification). In particular embodiments, the filled polymeric material comprises CERATA. In some embodiments, the filled polymeric material comprises a CERATA analog (e.g. a material made with the same formula as CERATA with slight modification). In particular embodiments, the filled polymeric material is selected from the group consisting of ACRYSTONE, ARISTECH, ARISTECH ACRYLIC, AVONITE, CERATA, CORIAN, ETURA, FORMSTONE, FOUNTAINHEAD, GIBRALTAR, SOLID SURFACING VENEER (SSV), SURELL, SWANSTONE, TRILLIUM, or an analog of any one of these materials. In some embodiments, the solid surface comprises LUCITE.

In some embodiments, the fixed image is scratch-resistant (e.g. the image is still visible when rubbed with steelwool or similar material). In certain embodiments, the fixed image is still visible after removing the top 1.0 millimeter of the fixed image (e.g. by grinding on a machine down 1.0 millimeter, or scratching the image down 1.0 millimeters). In some embodiments, the fixed image is still visible after removing the top 1.5 millimeters of the fixed image (e.g. by grinding on a machine down 1.5 millimeters, or scratching the image down 1.5 millimeters). In particular embodiments, the fixed image is still visible after removing the top 2.0 millimeters of the fixed image (e.g. by grinding on a machine down 2.0 millimeters, or scratching the image down 2.0 millimeters). In certain embodiments, the depth of the fixed image in the filled polymeric material is at least 1.0 (e.g. at least 1.1 millimeters). In other embodiments, the depth of the fixed image in the filled polymer material is at least 1.5 millimeters (e.g. 1.6 millimeters). In preferred embodiments, the depth of the fixed image in the filled polymer material is at least 2.0 millimeters (e.g. at least 2.1, 2.3, 2.4, . . . 3.0 millimeters).

In some embodiments, the fixed image comprises a dye. In certain embodiments, the fixed image comprises sublimated dye (e.g. sublimation dye that has been sublimated into a material). In particular embodiments, the fixed image comprises a heat sensitive dye. In some embodiments, the fixed image comprises a diffusion dye.

In other embodiments, the fixed image has a visual appearance (e.g. it can be seen by the human eye when light reflects off of it). In particular embodiments, at least a portion of the visual appearance is a one or more shades of black. In some embodiments, at least a portion of the visual appearance is one or more shades of red. In certain embodiments, at least a portion of the visual appearance is one or more shades of orange. In further embodiments, at least a portion of the visual appearance is one or more shades of yellow. In other embodiments, at least a portion of said visual appearance is one or more shades of green. In some embodiments, at least a portion of the visual appearance is one or more shades of blue. In yet other embodiments, at least a portion of the visual appearance is one or more shades of violet. In additional embodiments, at least a portion of the visual image is a pattern. In some embodiments, at least a portion of the visual image represents an object (e.g. animal, person, vase, tree, etc).

In some embodiments, the transfer medium comprises a sheet of paper (e.g. standard printed paper). In other embodiments, the transfer medium comprises high quality ink jet paper (e.g. Avery Brilliant Color Ink Jet Paper or Epson Photo Quality Ink Jet Paper).

In some embodiments, the present invention provides compositions comprising: a) a filled polymeric material comprising 20 to 45 percent polymethyl methacrylate and 55 to 80 percent alumina trihydrate; and b) a fixed image, wherein the fixed image is formed in the filled polymeric material, and wherein the fixed image has a fixed image optical density value within about 1.5 of a corresponding transfer image optical density value.

In certain embodiments, the present invention provides compositions comprising: a) a filled polymeric material comprising 20 to 45 percent polymethyl methacrylate and 55 to 80 percent alumina trihydrate; and b) a fixed image, wherein the fixed image is formed in the filled polymeric material, and wherein the fixed image has a fixed image optical density value of at least 0.7.

In some embodiments, the present invention provides methods for forming an image in a polymeric material, comprising; a) providing; i) a filled polymeric material comprising 20 to 45 percent polymethyl methacrylate and 55 to 80 percent alumina trihydrate; and ii) a transfer medium comprising a transfer image; and b) heating the filled polymeric material at a temperature of at least 155 degrees Celsius, and c) contacting at least a portion of the filled polymeric material with at least a portion of the transfer medium such that a fixed image is formed in the filled polymeric material.

DESCRIPTION OF THE FIGURES

The patent or application file contains four drawings executed in color. Copies of this patent or patent application publication with color drawing(s) will be provided to the Office and payment of the necessary fee will be made.

(FIG. 5J shows the result of using a pre-heat temperature of 325 degrees Fahrenheit, FIG. 5K shows the result of using a pre-heat temperature of 350 degrees Fahrenheit, and FIG. 5L shows the result of using a preheat temperature of 375 degrees Fahrenheit).

DEFINITIONS

To facilitate an understanding of the invention, a number of terms are defined below.

As used herein, the term "filled polymeric material" refers to any material containing at least 5 percent of a polymer (e.g. polyacrylic or polyester), and at least 10 percent of an inorganic filler (e.g. alumina trihydrate). Examples of filled polymeric materials include, but are not limited to, products marketed under the tradenames CORIAN, FOUNTAINHEAD, and AVONITE.

Figure 1:
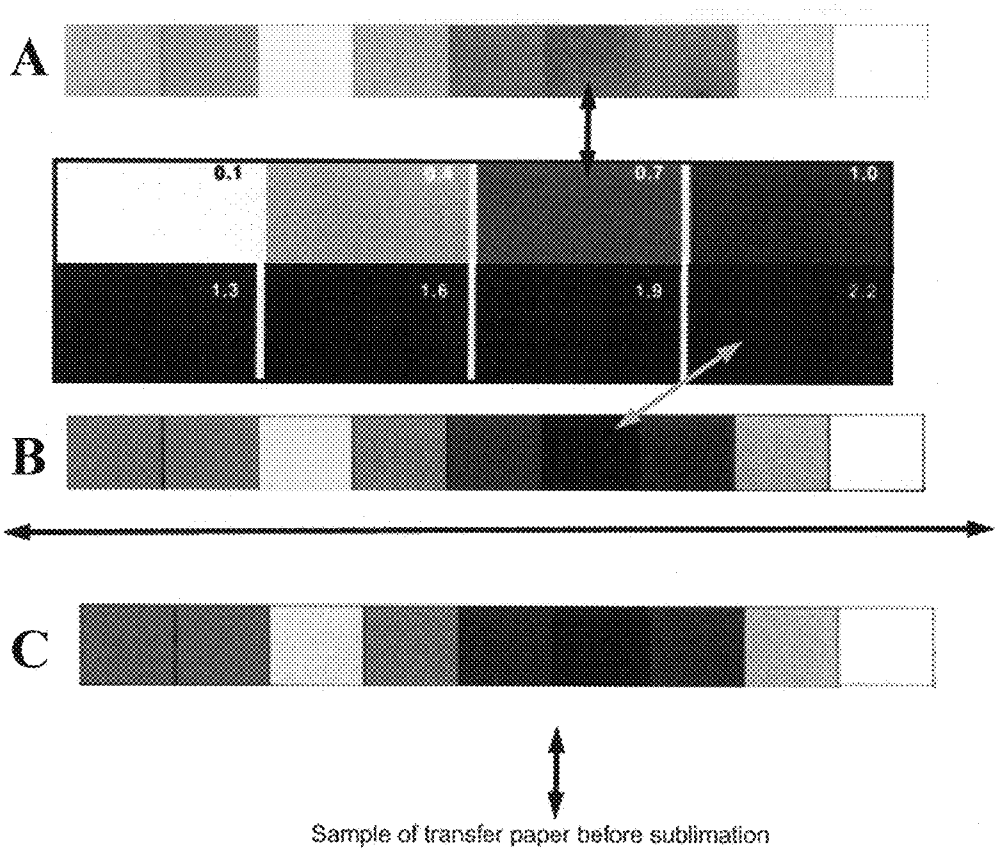
FIG. 1A shows a digital picture of an image produced in CORIAN using a pre-heat temperature of 218 degrees Fahrenheit (98 degrees Celsius), approximately 20 pounds per square inch of pressure, and a transfer temperature of 410 degrees Fahrenheit (210 degrees Celsius).
FIG. 1B shows a digital picture of a fixed image produced in CORIAN using a pre-heat temperature of 400 degrees Fahrenheit (about 204 degrees Celsius), approximately 45 pounds per square inch of pressure, and a transfer temperature of about 400 degrees Fahrenheit.
FIG. 1C shows a digital picture of a corresponding transfer image that was made by the same method used to make the actual transfer images used to make images in FIGS. 1A and 1B.
Figure 2:
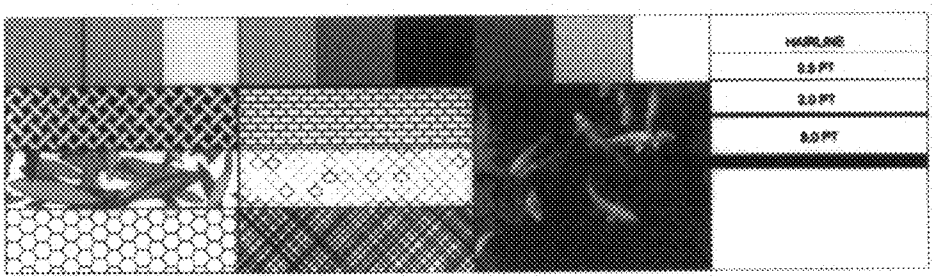
FIG. 2A-D shows digital photographs of fixed images produced in CORIAN (conditions are indicated in the figures) in sublimation transfer times of 10 seconds, 8 second, 6 seconds, and 4 seconds respectively.
Figure 2:
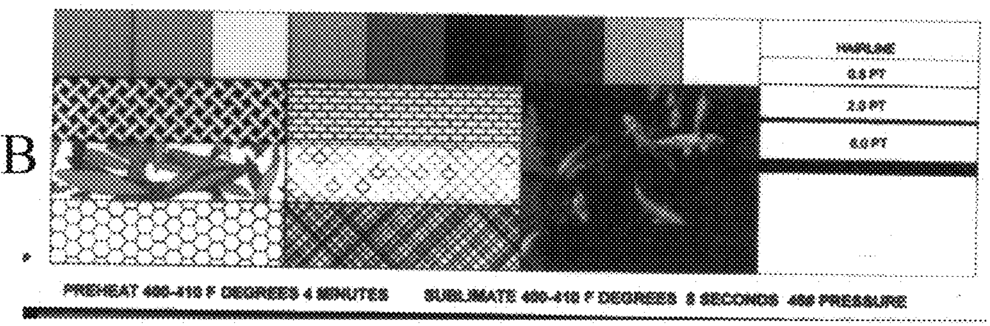
Figure 2:
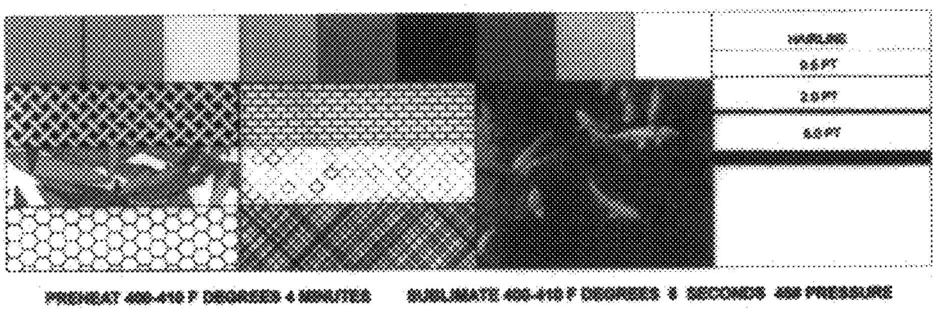
Figure 2:
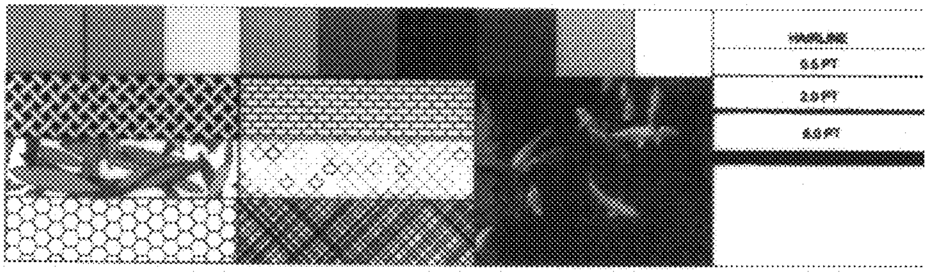

As used herein, the terms "fixed image" and "fixed image formed" in a material, refer to dye or ink that has been transferred into a solid surface (e.g. heat transferred into a filled polymeric material) and that changes the visual appearance of the solid surface (e.g. making it darker, or lighter, changes the color, adds a pattern or representation of an image). Also, a fixed image is an image that in not easily removed from the solid surface (e.g. cannot be removed with soap and water, and is resistant to extensive rubbing with steel wool or like material). Examples of digital photographs of fixed images are shown in FIG. 1 and FIG. 2.

As used herein, the term "optical density" refers to reflected light intensity measurement that can be made, for example, by a densitometer.

As used herein, the term "corresponding transfer image" refers to the dye in the transfer medium that could be used (e.g. in heat transfer printing) to form a fixed image in a solid surface such a filled polymeric material. Generally, the corresponding transfer image when compared to a fixed image, is not the actual transfer image used to transfer the image into the solid surface (since the transfer image is "spent"), but instead is made by the same method as the actual transfer image used to form the fixed image (e.g. the same digital picture is printed out onto the same type of paper using the same printer, etc). The digital picture shown in FIG. 1C is considered the corresponding transfer image of the digital picture of the fixed image shown in FIG. 1B.

As used herein, the term "fixed image optical density value" is an optical density value obtained from a fixed image, or a digital picture of a fixed image. This value may be obtained, for example, by using a densitometer or a gray scale.

As used herein, the term "transfer image optical density value" is an optical density value obtained from a transfer image, or a digital picture of a transfer image. This value may be obtained, for example, by using a densitometer or a gray scale.

As used herein, the term "transfer medium" refers to any material that is capable of having a transfer image formed in it (e.g. by an ink jet printer), and that can then transfer this image to a solid surface (e.g. filled polymeric material) under heat and/or pressure. Examples of transfer media include, but are not limited to, ordinary printer paper, high quality ink-jet paper, and fabric.

As used herein, the term "contacting-temperature" refers to the temperature at which the transfer image is applied to a solid surface.

As used herein, terms referring to trade name products such as ACRYSTONE, ARISTECH, ARISTECH ACRYLIC, AVONITE, CERATA, CORIAN, ETURA, FORMSTONE, FOUNTAINHEAD, GIBRALTAR, SOLID SURFACING VENEER (SSV), SURELL, SWANSTONE, and TRILLIUM refer to compositions as sold in the marketplace under these trade names. It will be appreciated that the chemical composition of any particular material may vary from batch to batch or from time to time and an understanding of the exact chemical composition of the material is not necessary for the practice of the present invention.

DESCRIPTION OF THE INVENTION

The following discussion provides a description of certain preferred illustrative embodiments of the present invention and is not intended to limit the scope of the present invention. For convenience, the discussion focuses on the application of the present invention to the process of heat transfer printing of fixed images, using sublimable dyes, into a solid surface that is a filled polymeric material, but it should be understood that the methods and systems are applicable and intended for use with a wide variety of similar materials. The description is provided in the following sections: I) Forming Fixed Images in Solid Surfaces; II) Solid Surface Materials; III) Transfer Mediums and Devices; IV) Dyes; V) Printing Devices; and VI) Fixed Image Characteristics.

I. Forming Fixed Images in Solid Surfaces

As discussed above, the presently claimed invention comprises systems and methods for transferring (e.g. heat transfer printing) images into solid surface materials. Heat transfer printing according to the present invention is performed, in some embodiments, by using a heat press. For example, a heat press is allowed to reach a temperature of approximately 400 degrees Fahrenheit. Then a piece of filled polymeric material (e.g. CORIAN) is placed in the press, face up. The press is then closed and the pressure adjusted (e.g. 30 psi, or 40 psi, or 45 psi). The filled polymeric material is left in the press for about 2-5 minutes (e.g. 4.0 minutes). The top platen on the press is released and a transfer image (e.g. a piece of paper with a digital picture printed therein with a color printer) is placed on the filled polymeric material (the transfer image is placed face down). The press is then closed again such that pressure is applied to the transfer image (e.g. 45 psi). The temperature used during image transfer may be approximately 400 degrees Fahrenheit (e.g. the sublimation dyes in the transfer image work well at about 400-410 degrees Fahrenheit). The transfer image is allowed to transfer for a time (e.g. 4 seconds, 10 seconds, 30 seconds, or 45 seconds). It was determined during the development of the present invention that longer transfer times tend to lead to deeper fixed images. In some embodiments, a physical constraint is used to surround the material so that it maintains its shape during heating. It was discovered during the development of the present invention that some materials may not retain their shape when preheated to high temperatures (e.g. 400 degrees Fahrenheit). The physical constraint (e.g. a masonite block cut to the appropriate size and shape to frame the polymer material) maintains the outer shape of the material during the process. It was also determined during the development of the present invention, that the combination of the constraint and heating can sometimes result in buckling of the polymer material, which prevents desired image transfer. Thus, in some embodiments, a high pressure is maintained around the material during heating and/or transfer to prevent buckling. In other embodiments, pressure is physically applied to the upper surface (e.g. the surface that is to receive an image) of the polymer material with a press during preheating and image transfer.

Methods for heat transfer printing using sublimation or other heat activated inks or dyes may be conducted using methods described in U.S. Pat. Nos. 5,246,518, 5,248,363 and 5,302,223 to Hale, incorporated herein by reference in their entireties. In addition, one process for heat transfer printing on solid surface materials is disclosed in U.S. Pat. No. 4,406,662 to Beran et al. (incorporated herein by reference in its entirety), but is not suitable for achieving high optical densities possible with the present invention. Importantly, the present invention provides preheating conditions not provided by Beran et al., and/or increased pressure not provided by Beran et al. and that allow high optical density fixed images to be produced (a result not possible with the methods of Beran et al. see FIG. 1A). Also, the present invention allows for very short image transfer times (e.g. much shorter than in Beran et al.), that allows rapid production (e.g. high throughput production) of products with high optical density images formed in them. The present invention thus provides a solution to the previously unmet need for bright, true, high optical density color image printing in filled polymeric materials.

II. Solid Surface Materials

A. Composition of Solid Surface Materials

The present invention provides systems and methods for forming fixed images in solid surface materials (e.g. heat transfer printing into solid surface materials). In certain embodiments, the solid surface material comprises polymeric material. In preferred embodiments, the solid surface material comprises a filled polymeric material. In some preferred embodiments, the solid surface is a filled polymeric article, wherein the filled polymeric article comprises an inorganic filler, preferably alumina trihydrate, mixed with a polymer component, preferably polymethyl methacrylate. A particularly preferred material is a filled polymeric article comprising 20 to 85 percent, preferably about 55 to about 80 percent by weight of alumina trihydrate and 15 to 80 percent, preferably about 20 to about 45 percent by weight polymethyl methacrylate. The composition of such an article is disclosed in U.S. Pat. Nos. 3,827,933 and 3,847,865 to Duggins et al. (incorporated herein by reference in their entireties).

In some embodiments, the filled polymeric article further contains a dispersion of short, colored fibers. One material is a filled polymeric article having 20 to 70 parts by weight of a crosslinked polymer having a glass transition temperature of at least 70 degrees C.; 80 to 30 parts, preferably 40 to 70 parts, by weight of an inert filler, preferably alumina trihydrate; and 0.01-2 percent by weight of the article of short, colored fibers such as nylon stock. The composition of such a article is disclosed in U.S. Pat. No. 4,107,135 to Duggins et al. (incorporated herein by reference in its entirety).

In some embodiments, the filled polymeric material further contains a dispersion of iron oxide pigments (e.g. selected according to particle size to avoid interference with desired properties). One type of material is a filled polymeric article comprising 15 to 80 percent by weight polymethyl methacrylate and 20 to 85% by weight alumina trihydrate with added iron oxide pigments. The composition of such an article is disclosed in U.S. Pat. No. 4,413,089 to Gavin et al. (incorporated herein by reference in its entirety).

In some embodiments, the filled polymeric article comprises (A) about 35 to 95 percent by volume of a matrix consisting essentially of (1) at least 34 percent by volume of polymer, preferably predominantly an acrylic polymer, having a refractive index between 1.4 and 1.65 and (2) about 1 to 50 percent by volume of at least one microscopic filler having an amorphous or mean crystalline axial refractive index between 1.4 and 1.65, (B) about 0.1 to 50 percent by volume of macroscopic opaque particles having an optical density to visible light greater than 2.0 and (C) about 0.1 to 50 percent by volume of macroscopic translucent and/or transparent particles having an optical density to visible light less than 2.0; in such a ratio of (A) to (B) to (C) that the optical density to visible light of a 0.05 inch thick wafer of the total composite is less than 3.0. The composition of such an article is disclosed in U.S. Pat. Nos. 4,085,246 and 4,159,301 to Buser et al. (incorporated herein by reference in their entireties).

In some embodiments, the filled polymeric article is a shaped structure having a polishable cultured onyx, cultured marble, or like mineral-appearing surface of predetermined hardness, the structure comprising a locally discontinuous phase comprising a synthetic organic resin portion hardened to the predetermined hardness and a visually distinguishable continuous phase comprising a synthetic organic resin portion separately hardened to the predetermined hardness with the discontinuous phase intimately distributed therein, whereby the structure surface is simulative of onyx or like mineral appearance and uniformly polishable in phase undifferentiated relation. The composition of such an article is disclosed in U.S. Pat. Nos. 4,433,070 and 4,544,584 to Ross et al. (incorporated herein by reference in their entireties).

In some embodiments, the filled polymeric material further comprises a flame retardant. Examples of such compositions are described in U.S. Pat. No. 4,961,995 to Ross et al. (incorporated herein by reference in its entirety). In other embodiments, the filled polymeric material comprises a resin matrix comprising a synthetic organic polymer such as an ortho or iso polyester, including halogenated polyesters, acrylics, or polycarbonates, and an inorganic filler such as alumina trihydrate that is dehydrated and rehydrated with a solution of dye, then dried to impart color. The composition of such articles are disclosed in U.S. Pat. No. 5,286,290 to Risley (incorporated herein by reference in its entirety).

In some embodiments, the filled polymeric article comprises an unsaturated polyester resin such as propylene glycol esterified with adipic and maleic anhydride of about 600 to about 300 centipoise viscosity, and containing a cross linking agent such as styrene monomer, formulated by adding an organic peroxide and solid filler material such as calcium carbonate to form a blend of about 20 to about 40 percent by weight of polyester resin and about 60 to about 80 percent by weight filler, then subjecting the composition to a mechanical deaeration process. The composition of such articles are disclosed in U.S. Pat. Nos. 4,473,673 and 4,652,596 to Williams et al. (incorporated herein by reference in their entireties).

In some embodiments, the filled polymeric material comprises a thermoplastic acrylic polymer, an impact enhancer thermoplastic polymer, a compatibilizing thermoplastic polymer, and an inorganic filler. A particularly preferred material is a filled polymeric article consisting of 16 to 28 percent, preferably 19 to 25 percent, by weight of a clear or transparent thermoplastic acrylic polymer, preferably polymethyl methacrylate; 16 to 28 percent, preferably 19 to 25 percent, by weight of a clear or transparent impact enhancer thermoplastic polymer, preferably styrene-acrylonitrile copolymer; 5 to 20 percent, preferably 8 to 15 percent, by weight of a clear or transparent compatibilizing thermoplastic polymer, preferably styrene-maleic anhydride copolymer with a maleic anhydride content of no more than 10 percent; and 20 to 65 percent, preferably 35 to 60 percent, by weight of an inorganic filler having an index of refraction similar to that of the polymers, such as barium sulfate, wollastonite, basic aluminum oxalate, or kaolin. The composition of such articles are disclosed in U.S. Pat. No. 5,856,389 to Kostrzewski et al. (incorporated herein by reference in its entirety).

In some embodiments, filled polymeric material comprises an inorganic filler such as alumina trihydrate, held together with a translucent polymer resin such as polyester or acrylic, to which is added a dispersion of translucent fire-retardant particles, comprised of small hard resin particles of different sizes containing pearlescent reflective flakes that are aligned in each particle with their flat surfaces generally parallel. The composition of such an article is disclosed in U.S. Pat. No. 6,040,045 to Alfonso et al. (incorporated herein by reference in its entirety).

In some embodiments, the filled polymeric article comprises a resin matrix, a suitable low profile additive, a catalyst, an inhibitor, a mold release agent, a flame retardant, an extender, and a reinforcer. One type of material is a filled polymeric article consisting of a resin of approximately 70 to 90 parts by weight of hydrogenated bis-phenol A, approximately 10 to 35 parts by weight of a low profile additive, approximately 1 to 1.5 parts by weight of a catalystic agent, 1000 ppm of an inhibitor, approximately 5 to 7 parts by weight of a mold release agent, approximately 100 to 150 parts by weight of a flame retardant agent, approximately 50 to 90 parts by weight of an extender, and a reinforcer comprised of glass fiber particles. The composition of such articles are disclosed in U.S. Pat. No. 5,393,808 to Buonaura et al. (incorporated herein by reference in its entirety).

In some embodiments, the filled polymeric article comprises approximately 10 to 25 parts by weight of a nonvolatile polyester backbone resin, approximately 10 to 25 parts by weight of an ethylenically unsaturated monomer, and approximately 50 to 80 parts by weight of a filler selected from the group consisting of alumina trihydrate, borax, hydrated magnesium calcium carbonate, and calcium sulfate dihydrate. The article may also include, for example, chips of a previously cured thermosetting resinous composition. The composition of such articles are disclosed in U.S. Pat. No. 5,244,941 to Bruckbauer et al. (incorporated herein by reference in its entirety).

In some embodiments, the filled polymeric material comprises an inorganic filler such as alumina trihydrate, held together with a translucent polymer resin such as neopentyl glycol/isophthalate polyester, to which is added a dispersion of filled crystalline thermoplastic resin particles. The composition of such articles are disclosed in U.S. Pat. No. 5,457,152 to Gaa et al. (incorporated herein by reference in its entirety).

In some embodiments, the filled polymeric article consists of 0 to 30 percent, preferably 10 to 25 percent by weight of polymethyl methacrylate dissolved in methyl methacrylate or other monomers; 20 to 60 percent, preferably 25 to 40 percent by weight of an inorganic filler, preferably alumina trihydrate; 0.1 to 3.5 percent by weight (monomer/syrup fraction of the mixture) of a thixotropic agent, preferably fumed silica; 1 to 12 percent by weight (total monomers content) of a crosslinking agent; a chain-transfer agent; and a polymerization initiator. The composition of such articles are disclosed in U.S. Pat. Nos. 5,521,243, 5,567,745, 5,705,552, 5,747,154, 5,985,972, and 6,177,499 to Minghetti et al. (incorporated herein by reference in their entireties).

Preferred solid surface materials of the present invention are shown in Table 1. These materials may be employed, as well as analogs of these materials.

TABLE 1

Commercially Available Solid Surface Materials

| Product Name | Manufacturer |
|---|---|
| AVONITE | Avonite, Inc. (Belen, NM) |
| CERATA | Hartson Kennedy (Marion, IN) |
| ETURA | Etura Corp. (sold at Home Depot) (Seaman, OH) |
| FOUNTAINHEAD | Formica Corp. (Odenton, MD) |
| GIBRALTAR | Wilsonart International (Temple, TX) |
| SOLID SURFACING VENEER | Wilsonart International (Temple, TX) |
| STARON | Samsung/Cheil Industries Inc. (La Mirada, CA) |
| SURELL | Formica Corp. (Odenton, MD) |
| SWANSTONE | The Swan Corp. (St. Louis, MO) |
| ACRYFLEX | AcryFlex Industries, Inc. (Hannon, Ontario) |
| ARISTECH ACRYLIC | Aristech Acrylics, LLC (Florence, KY) |
| CENTURA | Centura Solid Surfacing, Inc. (Westfield, IN) |
| CRISTALAN | Schock & Co. GmbH (Schorndorf, Germany) |
| CRISTALITE | Schock & Co. GmbH (Schorndorf, Germany) |
| FLORENTA | Florenata Solid Surfaces (Boynton Beach, FL) |
| HUDSON SURFACES | Hudson Surfaces (Tulsa, OK) |
| KARADON | Karadon Technologies Corp. (Surrey, British Columbia) |
| KERROCK | KerrockUSA (Union City, CA) |
| LASSICA | Vassallo Unlimited, Inc./ConstructCorp, Inc. (Mercedita, PR) |
| MARLAN | Polylac Holland BV (9350 AD Leek, The Netherlands) |
| SILESTONE | Cosentino USA (Dallas, TX) |
| TOPSTONE | Halstead International (Norwalk, CT) |
| TRILLIUM | Solid Surface Creations LLC (Madison, WI) |

B. Shapes of Solid Surfaces

The present invention contemplates solid surfaces, with a fixed image, with any shape or texture. In addition to the enormous variety of solid surface products currently in the marketplace (e.g. countertops, cutting boards), it is contemplated that the present invention will inspire and enable numerous new solid surface uses and articles, and expand the markets for such products. For example, because the present invention makes possible the printing of detailed, bright images of any desired design (e.g. any digital image may be printed) additional products may be developed, marketed, and sold.

Examples of shapes for solid surface materials that may have a fixed image therein, include, but are not limited to, kitchen and bathroom surfaces such as countertops, sinks, bathtubs, showers, and tiles; medical and laboratory surfaces such as countertops and sinks; architectural surfaces such as floor coverings, ceiling coverings, wall coverings, wainscoting, partitions, facings, doors, screens, parapets, moldings, window trimmings, eaves, gables, columns, handrails, and bumper rails; furniture products such as tables, chairs, shelving, and coat racks; illuminated articles such as lamps and lighting fixtures; hardware and accessories such as plate covers for light switches and electric sockets, hooks, knobs, picture frames, mirror frames, and clocks; kitchen crockery, utensils, and implements such as dishes, plates, bowls, cups, mugs, cutlery handles, knife blocks, cutting boards, sushi boards, cheese domes, napkin holders, Lazy Susans, paper towel holders, wine bottle decanters, canisters, and containers; bathroom implements such as soap dishes, soap dispensers, and shower caddies; visual display items such as signage, artworks, sculptures, carvings, murals, mobiles, vases, and corporate awards and gifts; recreational items such as golf clubs, game boards, roulette wheels, and yo-yos; musical items such as loudspeakers, guitars, woodwinds, and other musical instruments; and specialty items such as humidors, pens and writing implements, remote controls, cremation urns, fan blades, purse handles, cosmetic compacts, eyeglass frames, perfume stoppers, candle stick holders, appliances, shoe heels, pots, planters, tool handles, plaques, pen holders, easels, miniature doll house, shutters, blinds, and window cornices.

The present invention also provides the combination of fixed images and textured and/or shaped materials. For example, the present invention allows fixed images to appear on raised or lowered surfaces of solid surfaces. One example is forming a fixed image of fish swimming under water (See FIG. 2) in a solid surface, while making the fish raised from the rest of the solid surface (giving a 3-D affect). The image (e.g. fish) may be further textured (e.g. adding scales to the raised fish). Shaping may be conducted by heating the material after image transfer (e.g. to approximately 350 degrees F.) and then applying the heated material over a physical template (e.g. a carved wooden or metal block) containing the desired shape. The material may also be embossed to create physical texture to the material. Embossing may occur prior to, during, or after the printing process by contacting heated material with a negative or positive embossing template (e.g. a physical apparatus that carves into the heated material or an apparatus with openings or gaps that allow heated material to fill into). Other tooling methods for forming useful, interesting, or artistic solid surfaces includes, but is not limited to, electroforming, etching, punching, routing, laser etching, or computer controlled methods.

III. Transfer Media

In the present invention, a transfer image (e.g. comprising dye) is formed in any type of transfer media (e.g. sheet of paper). Examples of materials that may be used as a transfer medium, include, but are not limited to, (1) materials that can be printed upon by a printer, (2) materials that will facilitate and withstand heat transfer temperatures, and (3) materials that will facilitate incorporation of dye into the solid surface. In preferred embodiments, the transfer medium is standard bond paper. In other preferred embodiments, the transfer medium is high quality ink jet paper. However, the medium may be any paper, for example, any paper used with mechanical thermal printers, ink jet printers, and laser printers. Other materials, such as sheets of metal, plastic, or fabric may also be used. The use of transfer media is disclosed, for example, in aforementioned U.S. Pat. Nos. 4,406,662 to Beran et al., 5,246,518, 5,248,363, 5,302,223 and 5,487,614 to Hale, 5,431,501, 5,522,317, 5,555,813, 5,575,877, 5,590,600, 5,601,023, 5,640,180, 5,642,141, 5,734,396, and 5,830,263 to Hale et al. 5,746,816 to Xu, and 5,488,907 and 5,644,988 to Xu et al, herein incorporated by reference in their entireties.

In the present invention, a transfer image comprising a dye may be applied to a transfer medium for subsequent heat transfer into a solid surface. The dye may be applied to the transfer medium by any suitable means, including, but not limited to, computer-controlled devices such as mechanical thermal printers, ink jet printers, and laser printers. Thus, any digital image may be used including images of solid colors, patterned designs (e.g. marbled designs), and complex figures. The dye is printed at a temperature sufficient to apply the ink, but generally below the activation temperature of the dye. Generally, activation, or sublimation, of the dye does not take place at the time of printing the image on the medium, but occurs during the transfer from the medium to the solid surface.

In some preferred embodiments, the dye is applied to the transfer medium by means of a computer-controlled liquid ink printing device, such as an ink jet printer. In some embodiments, a bubble jet printer is used. In other embodiments, a free flow ink jet printer is used. In yet other embodiments, a piezo electric ink jet printer is used. In some embodiments, the dye is applied to the transfer medium by means of a computer-controlled solid ink printing device, such as a phase change ink jet printer. In some embodiments, a ribbon printer is used. In some embodiments, the dye is applied to the transfer medium by means of a computer-controlled electrographic printing device, such as a laser printer or photocopier. The use of such a devices for applying a dye composition to a transfer medium is disclosed in aforementioned U.S. Pat. Nos. 5,487,614 to Hale, 5,431,501, 5,522,317, 5,575,877, 5,601,023, 5,640,180, 5,642,141, 5,734,396, and 5,830,263 to Hale et al., 5,746,816 to Xu, and 5,488,907 and 5,644,988 to Xu et al.

Additional printing apparatuses contemplated under the present invention include, but are not limited to, products marketed by companies such as Brother (Bridgewater, N.J.), Canon (Lake Success, N.Y.), Encad (San Diego, Calif.), Epson (Long Beach, Calif.), Hewlett-Packard (Palo Alto, Calif.), Eastman Kodak (Rochester, N.Y.), Lexmark (Lexington, Ky.), Minolta (Ramsey, N.J.), Oki Data (Mt. Laurel, N.J.), Ricoh (West Caldwell, N.J.), and Xerox (Stamford, Conn.). Other preferred printers include, but are not limited to, EPSON STYLUS PRO, EPSON STYLUS PRO XL, EPSON STYLUS COLOR 3000, EPSON 800, EPSON 850, and EPSON 1520.

IV. Dyes

In some preferred embodiments, the composition used to create the transfer image is a dye that is produced from sublimation, dye diffusion, or heat sensitive dyes. Dye solids of small particle size, preferably 0.5 microns or less in diameter, are dispersed in a liquid carrier, and one or more agents are used to maintain what may be called, according to various definitions, a collodial, dispersion or emulsion system. A particularly preferred composition is a liquid dye consisting of 0.05 to 20 percent by weight of one or more sublimation, dye diffusion, or heat sensitive dyes; 0.05 to 30 percent by weight of a dispersant and/or emulsifying agent; 0 to 45 percent by weight of one or more solvents or co-solvents; 0 to 15 percent by weight of one or more additives; and 40 to 98 percent by weight of water. Such a compositions are disclosed in U.S. Pat. Nos. 5,640,180, 5,642,141, and 5,830,263 to Hale et al. (incorporated herein by reference in their entireties).

One preferred composition is a dye containing 5 to 30 percent by weight of one or more heat activated dyes; 1 to 20 percent by weight of an emulsifying enforcing agent; 0 to 30 percent by weight of a binder; 0 to 40 percent by weight of one or more humectants; 0 to 10 percent by weight of a foam control agent; 0 to 2 percent by weight of a fungicide; 0 to 10 percent by weight of a viscosity control agent; 0 to 10 percent by weight of a surface tension control agent; 0 to 10 percent by weight of a diffusion control agent; 0 to 15 percent by weight of a flow control agent; 0 to 20 percent by weight of an evaporation control agent; 0 to 10 percent by weight of a corrosion control agent; 0 to 30 percent by weight of a co-solvent; and 30 to 90 percent of a solvent, which may be water. Such compositions are disclosed in U.S. Pat. Nos. 5,488,907 to Xu et al. and 5,601,023 and 5,734,396 to Hale et al. (incorporated herein by reference in their entireties).

In some embodiments, the composition (e.g. ink) used to create the transfer image comprise a solid dye that comprises heat activated dyes, and a phase change material, or transfer vehicle, that will liquefy upon the application of heat to the ink composition. A polymer binder and additives may be added to the dye composition. A particularly preferred composition is a solid ink containing 5 to 30 percent by weight of one or more heat activated dyes; 20 to 70 percent by weight of a transfer vehicle such as wax or a wax-like material; 1 to 20 percent by weight of an emulsifying enforcing agent; 0 to 30 percent by weight of a binder; 0 to 15 percent by weight of a plasticizer; 0 to 10 percent by weight of a foam control agent; 0 to 10 percent by weight of a viscosity control agent; 0 to 10 percent by weight of a surface tension control agent; 0 to 10 percent by weight of a diffusion control agent; 0 to 15 percent by weight of a flow control agent; 0 to 10 percent by weight of a corrosion control agent; and 0 to 5 percent of an antioxidant. Such compositions are disclosed in aforementioned U.S. Pat. Nos. 5,488,907 to Xu et al. and 5,601,023 and 5,734,396 to Hale et al.

In some embodiments, the compositions used to create the transfer image are solid dyes that comprise heat activated dyes and a phase change material, or transfer vehicle, that will liquefy upon the application of heat to the dye composition. A polymer binder and additives may be added to the dye composition. A particularly preferred composition is a solid dye containing 5 to 30 percent by weight of one or more heat activated dyes; 30 to 70 percent by weight of a transfer vehicle such as wax or a wax-like material; 0 to 30 percent by weight of a binder; and 0 to 30 percent of one or more additives. Such compositions are disclosed in U.S. Pat. Nos. 5,302,223 and 5,487,614 to Hale, 5,431,501, 5,522,317, and 5,575,877 to Hale et al., and 5,644,988 to Xu et al. (incorporated herein by reference in their entireties).

In some embodiments, the compositions used to create the transfer image are liquid dyes that are produced from sublimation, dye diffusion, or heat sensitive dyes. The composition may comprise monomer or polymer materials in either solvent or emulsion form, an initiator or catalyst (which may be compounded into the inks so as to provide separation from the polymer), a surface tension control agent, a dispersing agent, a humectant, a corrosion inhibitor, a flow control aid, a viscosity stabilization aid, an evaporation control agent, a fungicide, an anti-foaming chemical, a fusing control agent, and antioxidants. A particularly preferred composition is a liquid ink containing of, in addition to inks or dyes, 10 to 20 percent by weight of a surface preparation material; 40 to 90 percent by weight of a solvent, 0 to 40 percent by weight of a co-solvent; and 0 to 30 percent by weight of one or more additives. Such a composition is disclosed in aforementioned U.S. Pat. Nos. 5,487,614 to Hale, 5,431,501, 5,522,317, and 5,575,877 to Hale et al., and 5,644,988 to Xu et al.

In some embodiments, the dye composition used to create the transfer image is a liquid dye that is produced from sublimation, dye diffusion, or heat sensitive dyes. Dye solids of small particle size, no larger than 0.5 microns in diameter, preferably 0.1 microns or less in diameter, are dispersed in a liquid carrier, and one or more agents are used to maintain what may be called, according to various definitions, a collodial, dispersion or emulsion system. A particularly preferred composition is a liquid ink containing 0.05 to 5 percent by weight of one or more sublimation, dye diffusion, or heat sensitive dyes; 0.05 to 40 percent by weight of a dispersant and/or emulsifying agent; 0 to 45 percent by weight of one or more solvents or co-solvents; 0 to 20 percent by weight of one or more additives; and 40 to 98 percent by weight of water. Such a composition is disclosed in U.S. Pat. No. 5,746,816 to Xu (incorporated herein by reference in its entirety).

In some embodiments, the dye composition used to create the transfer image is a dry toner composition that comprises heat activated dyes encased in a molecular sieve product, one or more binder polymers, and/or one or more charge control additives. A particularly preferred composition is a solid ink containing 3 to 20 percent by weight of a molecular sieve product containing one or more heat activated dyes; 50 to 90 percent by weight of one or more binder materials; and 0.5 to 10 percent of one or more charging additives. Such a composition is disclosed in U.S. Pat. Nos. 5,555,813 and 5,590,600 to Hale et al. (incorporated herein by reference in their entireties).

Additional dye and ink compositions and materials contemplated under the present invention include, but are not limited to, products marketed under the names SUBLIJET, SUBLIRIBBON, and SUBLITONER (Sawgrass Systems, Mt. Pleasant, S.C.), CELANOL, KEYCO DISPERSE, KEYMICRO, KEYSCREEN, KEYSPERSE, KEYSTONE, KEYTRANS, and SUBLAPRINT (Keystone Aniline Corporation, Chicago, Ill.), BAFIXAN and CELLITON (BASF A.G., Ludwigshafen, Germany), EASTMAN (Eastman Chemical Company, Kingsport, Tenn.), INTRATHERM (Crompton & Knowles Corporation, Stamford, Conn.), DIACELLITON, DIANIX, and DIARESIN (Mitsubisihi Chemical Industries, Ltd., Tokyo, Japan), DYSTAR (DyStar Textilfarben GmbH & Co., Frankfurt, Germany), SUMIPLAST and SUMIKALON (Sumitomo Chemical Co., Ltd., Osaka, Japan), DISPERSOL, VYNAMON, and WAXOLINE (Imperial Chemical Industries Ltd., London, England), CATULIA (Francolor Company, Riefux, France) AUTOTOP, CIBACET, TERAPRINT, and TERASIL (Ciba-Geigy Corporation, Ardsley, N.Y.), OPLAS (Orient Chemical Industries, Ltd., Osaka, Japan), HOSTASOL and SAMARON (Hoechst AG, Frankfurt, Germany), ASTRAZON, CERES, MACROLEX, and RESOLIN (Bayer AG, Leverkusen, Germany), AIZEN (Hodogaya Chemical Co., Ltd., Japan), ORCOCILACRON and ORCOSPERSE (Organic Dyestuffs Corporation, Providence, R.I.), KAYACRYL, KAYALON, KAYANOL, AND KAYASET (Nippon Kayaku Co., Ltd., Tokyo, Japan), and MIKAZOL and MIKETON (Mitsui & Co., New York, N.Y.).

The present invention is not limited by the color of the dye. For example, experiments conducted during the development of the present invention demonstrated that over one hundred colors corresponding to sublimation dyes available from Sawgrass Systems, Inc. were readily transferred into CORIAN using the methods of the present invention. CORIAN is currently marked in a limited number of colors and patterns. The present invention provides systems, compositions, and methods for dramatically expanding the range of colors and patterns of CORIAN available. Specific types of colors and their properties (e.g. the red/blue/green components of each color) are available for thousands of colors from Sawgrass Systems, Inc.

V. Printing Systems and Devices

The transfer images of the present invention are generally applied with heat and pressure. Any system or device that is capable of applying heat and/or pressure to a transfer medium containing a transfer image such that a fixed image is formed in a solid substrate is useful for practicing the present invention. In some embodiments, a heat transfer press is employed. The use of a heat transfer machine/device to transfer dyes from the transfer medium to the solid substrate is disclosed in aforementioned U.S. Pat. Nos. 4,406,662 to Beran et al., 5,246,518, 5,248,363, 5,302,223 and 5,487,614 to Hale, 5,431,501, 5,522,317, 5,555,813, 5,575,877, 5,590,600, 5,601,023, 5,640,180, 5,642,141, 5,734,396, and 5,830,263 to Hale et al., 5,746,816 to Xu, and 5,488,907 and 5,644,988 to Xu et al., herein incorporated by reference in their entireties.

Additional heat transfer apparatuses that may be employed with methods and systems of the present invention include, but are not limited to, products marketed by companies such as Geo Knight & Co. (Brockton, Mass.), Hix Corporation (Pittsburg, Kans.), and National Equipment (Pittsburg, Kans.).

Figure 3:
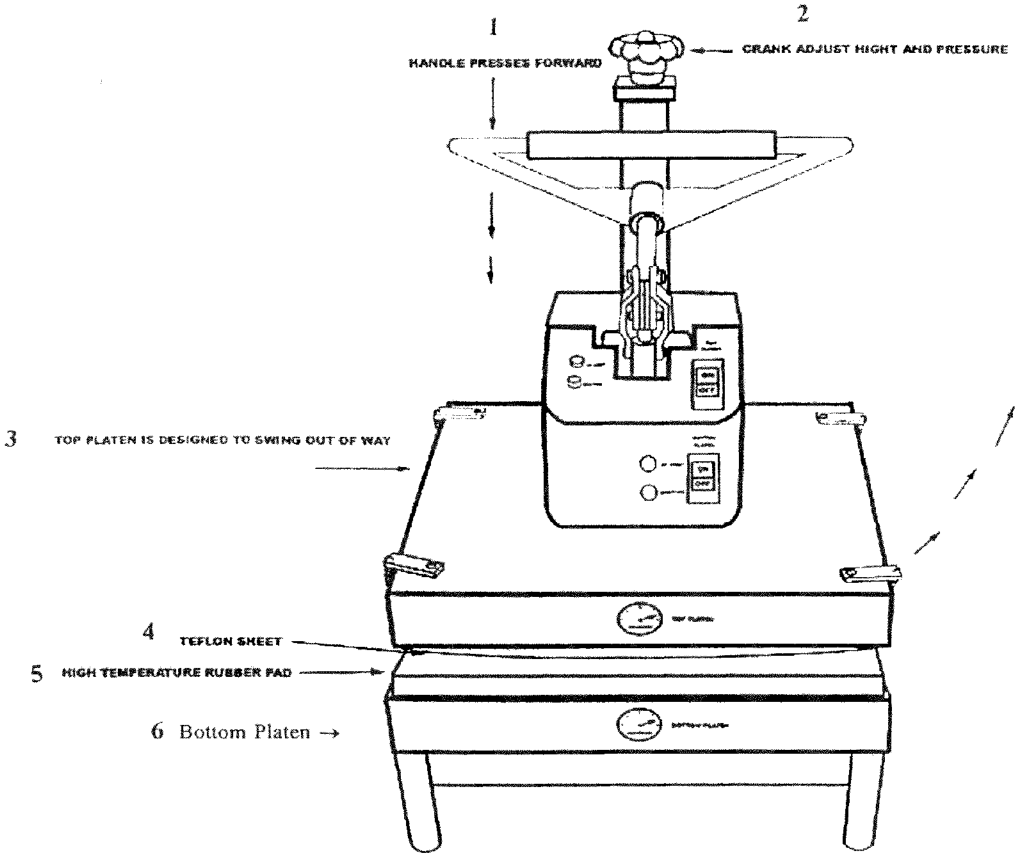
FIG. 3 shows one embodiments of a double-heat press useful in the forming the fixed images of the present invention.

In some preferred embodiments, a system or device that is capable of heating the solid surface material from at least 2 sides is employed. An example of one such device is depicted in FIG. 3. Similar systems or devices may be constructed to heat the solid surface material from at least two sides. Such systems allow even heating of polymers to be printed into.

The double-heat press shown in FIG. 3 is useful for performing the methods of the present invention. A handle (1) is shown in FIG. 3 for heating up and pressing down on the solid surface material. A crank (2) may be used to adjust the height and pressure applied to the solid surface material in the press. A top (3) platen is what actually comes down onto the transfer medium and solid surface material, and is also configured to swing away so the transfer medium may be inserted during operation. A TEFLON sheet (4) is shown that holds the bottom of the solid surface material, and is used to separate the heat platen from the object the image is being transferred into. A high temperature rubber pad (5) is shown that is squeezed down when pressure is applied. Finally, a bottom platen (6) is shown that is capable of heating the bottom side of the solid surface material.

Systems may also be employed with the present invention that combine heating components and pressure components, and that allow for large-scale production of solid surfaces with fixed images. These systems include, for example, kilns, roller type assembly lines, and transfer images on rolls that are applied as the solid surfaces passes by. Experiments conducted during the development demonstrated that the printing methods of the present invention may be conducted for only a few seconds to obtain high quality images. Therefore, in some embodiments heated rollers are used to continuously print images onto/into polymer materials that are fed through the rollers, wherein the material need only contact the rollers for a few seconds to enable image transfer. In some such embodiments, the material fed through the rollers is preheated in a separate portion of the apparatus prior to being passed through the rollers for printing. Using such embodiments, the present invention provides methods for high throughput production of printed materials and for the printing of large sections of materials.

In some embodiments, a plurality of printing apparatuses of the present invention are provided in a single system (e.g. in a single facility) to allow high production levels of printed polymer materials. In some such embodiments, two or more apparatuses or banks of apparatuses are controlled by a central control unit (e.g. a computer processor operably connected to the printing apparatuses). In some embodiments, large printing jobs (e.g. printing for architectural works) are carried out on multiple different printing devices, wherein each device is assigned a portion of the total project by the central control unit. In some embodiments, the central control unit also provides a system for labeling and/or tracking products (e.g. to facilitate shipment or delivery of products to customers). In still other embodiments, the central control unit provides, or is linked to a system that provides, order entry capabilities. For example, in some embodiments, a customer selects a pattern or provides a pattern to be printed to the central control unit and the pattern is printed into polymer materials for shipment to the customer. In some embodiments, the customer selects the pattern from a home computer or a computer in a retail store and the information is passed to the central control unit (e.g. located in a production facility) over a communication network (the Internet). Thus, the present invention allows customers to select any desired image (e.g. a digital photograph or artistic work) and transfer the image to a production facility to have the printed polymer materials generated and shipped to the customer. Because the present invention provides, for the first time, the ability to print detailed, bright colored images into previously resistant polymers and because the present invention provides production capabilities, a new market for custom design products is created. In some preferred embodiments, many or all of the production steps are automated, allowing product ordering to product production to be carried out with little to no human intervention.

VI. Fixed Image Characteristics

The systems and methods of the present invention allow fixed images to be transferred into filled polymeric materials with high levels of dye transfer. The resulting fixed images have novel characteristics. One of these characteristics that is conveniently measured is optical density. The fixed images of the present invention have optical densities very close to the original transfer image's optical density, as well as very high optical density values in general.

Optical density may be determined by employing a gray scale as shown in FIG. 1, between "A" and "B". For example, both A and B in FIG. 1 show images that are formed in CORIAN. The gray scale allows one to determine the approximate optical density of, for example, the black color in each of the images. It is clear that the image in A has an optical density value of less than 0.7 (notice the arrow, and the fact that the gray scale 0.7 is darker than the black box shown in A). Looking at B, it is clear that the black box in B is approximately 2.2 as there is no noticeable difference between the 2.2 on the gray scale and the black box in B.

Another method for measuring optical density is with the aid of a densitometer or other conventional methods. For example, a densitometer may be employed to directly measure the optical density of a solid material with a fixed image.

Alternatively, a digital photograph of a solid material with a fixed image may be printed out and then analyzed with a densitometer.

While the human eye is a very good comparison device (it can perceive density variations and compare them to a known calibrated standard that identifies specific density levels), it cannot, however, assign specific numerical values to those variations. A densitometer, on the other hand, can assign numbers to the density variations the eye perceives by quantifying the amount of light that is reflected from the surface of material such as filled polymeric material with a fixed image formed therein. The densitometer is used to measure the light that would normally be reflected from the surface and reach the eye. A minimum of reflected light results in a high density, in other words the sample absorbs a good deal of light.

Densitometers are routinely used for quality control in printing. Measurements in printing are primarily concerned with the primary colors of cyan, magenta, yellow and black. The light emitted by the light source consists of the three light colors of red, green, and blue. Since the proportions of these three colors are approximately equal, we perceive this light as white light. The quantity of light received by the photo diode in a densitometer are converted into electricity, and the internal electronics compare this measured current with a reference value (e.g., white). The difference obtained is the basis for calculating the absorption characteristics of the image being measured.

Color filters in the ray path of the densitometer may be used to restrict the light to the wavelengths relevant for image or portion of the image being measured. Color filters possess the property of allowing their own color to pass through and absorbing or blocking the rays of other colors.

The high quality of the fixed images of the present invention may also be evaluated by comparing the original transfer image (e.g. color print out on high quality paper) with the final fixed image in the polymeric material. Surprisingly, the fixed images of the present invention closely resemble the original transfer image. In order to evaluate how close the fixed image is to the original transfer image, optical density measurement of the original transfer image and the fixed image may be obtained and compared. These optical density values may be from the fixed image and transfer images themselves, or a digital image of the fixed image and the transfer image may be obtained and then compared. For example, one may compare the digital photograph of the fixed image shown in FIG. 1B with the digital image of the corresponding transfer image shown in FIG. 1C.

Comparing the optical density values from a transfer image and a fixed image may be done as simply as subtracting one value from the other. For example, if a transfer image has an optical density value of 2.2, and a fixed image has an optical density value of 2.0, one could simply subtract 2.0 from 2.2 to obtain 0.2 as the difference between the two values (i.e. the fixed image is within 0.2 of the transfer image in this example). Another way to make a quantitative comparison between the transfer image and the fixed image is to employ software to compare digital images of each. In this regard, the high quality of the fixed images of the present invention may be quantitatively compared to an original transfer image (e.g. a transfer image prepared by the same method as the transfer image used to make the fixed image).

EXPERIMENTAL

The following examples are provided in order to demonstrate and further illustrate certain preferred embodiments and aspects of the present invention and are not to be construed as limiting the scope thereof.

Example 1

Side-by-Side Comparison

This example describes a side-by-side comparison of certain methods of the present invention with conditions described in U.S. Pat. No. 4,406,662 to Beran et al. (hereinafter "Beran"). In particular, the methods of the present invention were used with a sample of CORIAN and the results compared to Beran conditions (also in CORIAN).

The Beran conditions were followed using a heat press and a color bar transfer image (see FIG. 1C showing corresponding transfer image) that was composed of SubliJet ink (Sawgrass Systems, Inc.). The method was performed by pre-heating a sample of white CORIAN at a temperature of 218 degrees Fahrenheit (98 degrees Celsius), adding the transfer image with approximately 20 pounds per square inch of pressure and a transfer temperature of 410 degrees Fahrenheit (210 degrees Celsius), and transferring for 30 seconds. A digital image of the resulting image in the CORIAN was made with a scanner (the CORIAN fixed image made as described below was also scanned at the same time in the same scanned image), and the results are shown in FIG. 1A.

An example of the technique in one embodiment of the present invention was performed using a heat press and a color bar transfer image (see FIG. 1C showing corresponding transfer image), that was composed of SubliJet ink (Sawgrass Systems, Inc.). The method was performed by preheating a sample of white CORIAN at a temperature of 400 degrees Fahrenheit (about 204 degrees Celsius) for about 4 minutes with approximately 45 pounds per square inch of pressure. The transfer image was then added at approximately 45 pounds per square inch of pressure and at a transfer temperature of about 400 degrees Fahrenheit for a transfer time of 45 seconds. A digital image of the resulting fixed image in the CORIAN was made with a scanner (the CORIAN image made by the Beran method was also scanned at the same time in the same scanned image), and the results are shown in FIG. 1B.

As shown in FIG. 1 when A and B are compared, the image produced using the methods of the present invention are clearly superior (FIG. 1B) to those made according to the Beran method (FIG. 1A). For example, comparing the black box in both 1A and 1B, the superior results of the present invention are revealed. Examining FIG. 1A, it is clear (as shown by the arrow to the gray scale) that this method did not even achieve 0.7 on the gray scale (the 0.7 on the gray scale is darker than the black box in FIG. 1A). In contrast, examining FIG. 1B, it appears that the black box has a value of about 2.2, which is much greater than the less than 0.7 value shown in FIG. 1A. Furthermore, the data in FIG. 1 makes it clear, in comparison to the corresponding transfer image shown in FIG. 1C, the methods of the present invention (See, FIG. 1B) are very close the transfer image, while the colors and shades in FIG. 1A are dull and washed out. It should be noted that while certain conditions from U.S. Pat. No. 4,406,662 were used, resulting in the dull image, the selection of dyes and other components were not taught in U.S. Pat. No. 4,406,662. Thus, U.S. Pat. No. 4,406,662 cannot be said to even teach methods capable of producing the dull images obtained in this example (i.e. U.S. Pat. No. 4,406,662 cannot be credited with providing a teaching capable of producing the results obtained in this example, let alone results approaching this dull result).

It is clear that the present invention, for the first time, provides the methods needed to achieve rich quality color on solid surfaces such as CORIAN.

Example 2

Forming Fixed Images in CORIAN

This example describes forming fixed images in CORIAN. In particular, this example describes forming fixed images in four white samples of CORIAN using various short sublimation/transfer times.

The four white samples of CORIAN were all made using a Geo. Knight & Co., Inc. heat press. For each of the four samples, the CORIAN material was pre-heated at a temperature of 400-410 degrees Fahrenheit for 4 minutes. The transfer image, that was composed of SubliJet ink (Sawgrass Systems, Inc.), was transferred, for each of the four samples, at a temperature of 400-410 degrees Fahrenheit with 45 pounds per square inch of pressure. The various transfer times were 10 seconds (FIG. 2A), 8 seconds (FIG. 2B), 6 seconds (FIG. 2C), and 4 seconds (FIG. 2D). The results of this example can be seen and compared in FIG. 2. Importantly, even the short transfer times gave very good, crisp results.

Example 3

Forming Fixed Images in FOUNTAINHEAD

Figure 4:
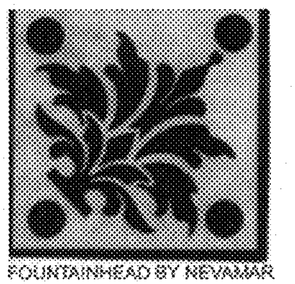
FIG. 4 shows a digital photograph of a fixed image in FOUNTAINHEAD (FIG. 4A), and in GIBRALTAR (FIGS. 4B and 4C).
Figure 4:
Figure 4:
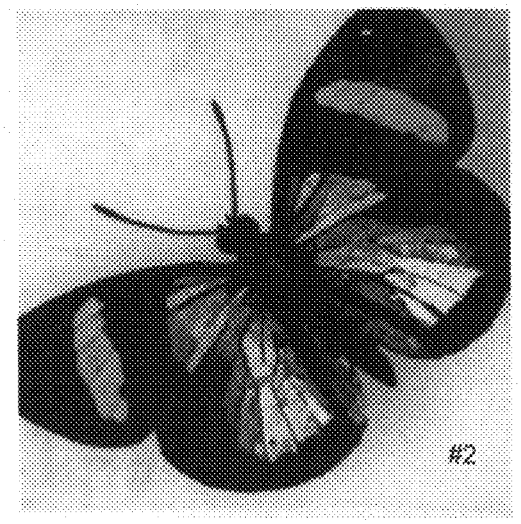

This example describes forming a fixed image in FOUNTAINHEAD. Specifically, a sample of FOUNTAINHEAD was preheated at a temperature of 400 degrees Fahrenheit for 4 minutes with 45 pounds per square inch of pressure. A transfer image with a design, that was printed on Nova Chrome (Pleasant Hill, Calif.) transfer paper, was then applied to the FOUNTAINHEAD at 400 degrees Fahrenheit for 45 seconds under 45 pounds per square inch of pressure. The results are present in FIG. 4A, and show excellent black and color detail.

Example 4

Forming Fixed Images in GIBRALTAR

This example describes forming fixed images in GIBRALTAR. Specifically, two samples of designer white GIBRALTAR were preheated at a temperature of 400 degrees Fahrenheit for 4 minutes with 45 pounds per square inch of pressure. Transfer images with a butterfly or a flower and pattern, that were printed on Nova Chrome (Pleasant Hill, Calif.) transfer paper, were then applied to the GIBRALTAR sample at 400 degrees Fahrenheit for 45 seconds under 45 pounds per square inch of pressure. The results are present in FIGS. 4B and 4C, and show excellent black and color detail.

Example 5

Forming Fixed Images in AVONITE

This example describes forming fixed images in AVONITE. Specifically, two samples of AVONITE were tested using the same conditions except for the transfer time. Both samples of AVONITE were preheated at a temperature of 400-410 degrees Fahrenheit for 4 minutes with 45 pounds per square inch of pressure. Transfer images with black patterns printed on Nova Chrome (Pleasant Hill, Calif.) transfer paper, were then applied to the samples of AVONITE at 400 degrees Fahrenheit under 45 pounds per square inch of pressure. One of the samples had a transfer time of 45 seconds and the other sample had a transfer time of 1 minute and 30 seconds. Both of the samples had dark, clear fixed images. However, the longer transfer time (i.e. 1 minute, 30 seconds), showed even darker lines, and it appeared that the dye penetrated further into the AVONITE.

Example 6

Forming Fixed Images with Varying Preheating Temperatures

This example describes forming fixed images in CORIAN. In particular, this example describes forming fixed images in three white samples of CORIAN using various preheating temperatures.

Figure 5:
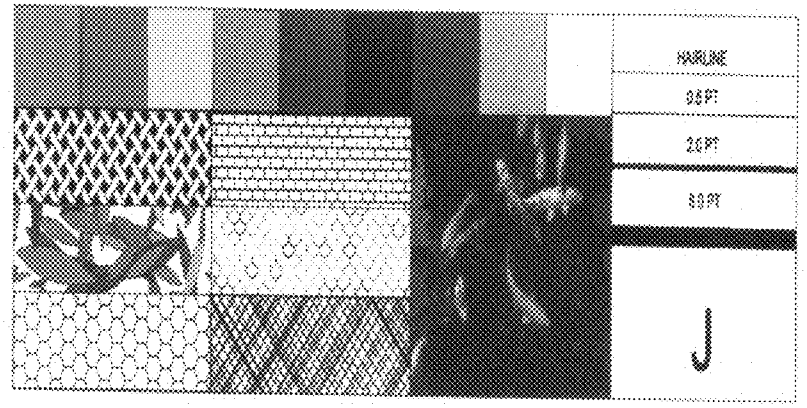
FIG. 5 shows a digital photograph of fixed images in CORIAN, that were formed with various pre-heat temperatures
Figure 5:
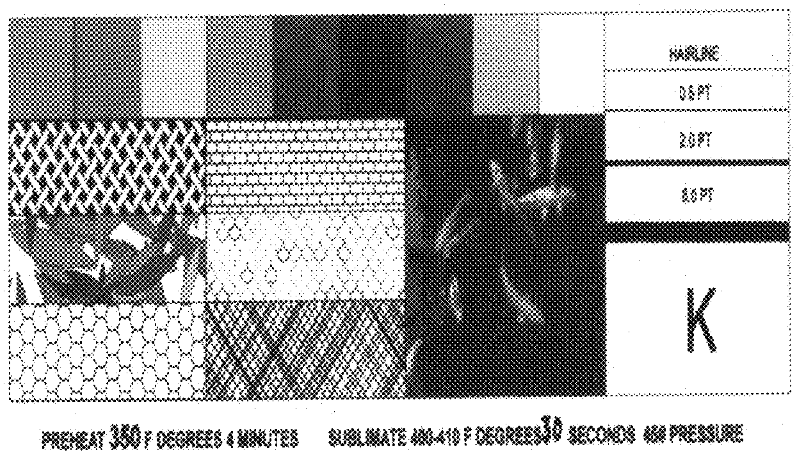
Figure 5:
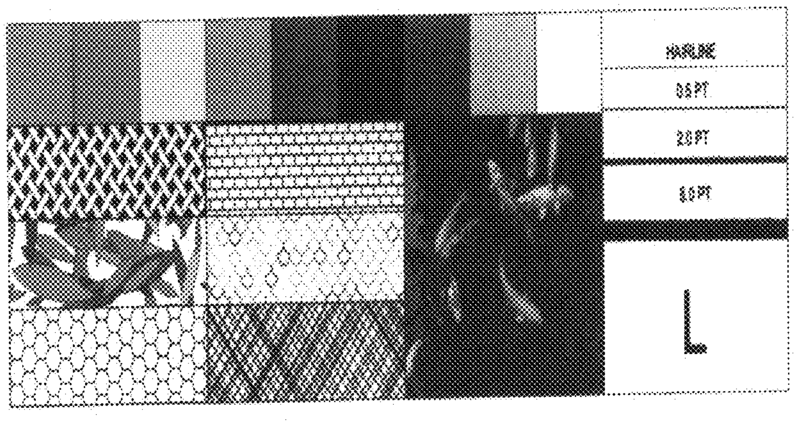

The three white samples of CORIAN were all made using a Geo. Knight & Co., Inc. heat press using the same conditions except for different preheating temperatures. The first sample (FIG. 5J) was preheated at 325 degrees Fahrenheit for 4 minutes. The second sample (FIG. 5K) was preheated at 350 degrees Fahrenheit for 4 minutes. The third sample (FIG. 5L) was preheated at 375 degrees Fahrenheit for 4 minutes. The transfer images were generated on an EPSON STYLUS COLOR 850 with Sawgrass Systems, Inc. SUBLIJET INK. The transfer image was transferred, for each of the three samples, at a temperature of 400-410 degrees Fahrenheit with 45 pounds per square inch of pressure for 30 seconds. The results of this example can be seen in the digital photographs taken of these CORIAN samples and presented in FIG. 5.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in relevant fields are intended to be within the scope of the following claims.

I claim:

1. An article of manufacture comprising:

a) a filled polymeric material comprising a polymer component and an inorganic filler, wherein said filled polymeric material comprises polymethyl methacrylate, and wherein said inorganic filler comprises alumina trihydrate; and b) a fixed image, wherein said fixed image is formed in said filled polymeric material, and wherein said fixed image has a fixed image optical density value within 1.5 of a corresponding transfer image optical density value.

2. The article of manufacture of claim 1, wherein said fixed image optical density value is within 1.0 of said corresponding transfer image optical density value.

3. The article of manufacture of claim 1, wherein 15-80 percent by weight of said filled polymeric material comprises said polymer component.

4. The article of manufacture of claim 1, wherein 20-45 percent by weight of said filled polymeric material comprises said polymethyl methacrylate.

5. The article of manufacture of claim 1, wherein 20-85 percent by weight of said filled polymeric material comprises said inorganic filler.

6. The article of manufacture of claim 1, wherein 55-80 percent by weight of said filled polymeric material comprises alumina trihydrate.

7. The article of manufacture of claim 1, wherein said fixed image comprises dye.

8. An article of manufacture comprising:

a) a filled polymeric material comprising a polymer component and an inorganic filler, wherein said inorganic filled comprises alumina trihydrate, and said polymer component comprises polymethyl methacrylate; and b) a fixed image, wherein said fixed image is formed in said filled polymeric material, and wherein said fixed image has a fixed image optical density value of at least 0.7.

9. The article of manufacture of claim 8, wherein said fixed image optical density value is at least 1.0.

10. The article of manufacture of claim 9, wherein said fixed image optical density value is at least 1.5.

11. The article of manufacture of claim 8, wherein 15-80 percent by weight of said filled polymeric material comprises said polymer component.

12. The article of manufacture of claim 8, wherein 20-45 percent by weight of said filled polymeric material comprises polymethyl methacrylate.

13. The article of manufacture of claim 8, wherein 20-85 percent by weight of said filled polymeric material comprises said inorganic filler.

14. The article of manufacture of claim 8, wherein 55-80 percent by weight of said filled polymeric material comprises said alumina trihydrate.

* * * * *